ic Patent Office 3,458,564
Patented July 29, 1969

3,458,564
CYCLOPENTANEDIONE DERIVATIVES
Gerhard R. Wendt, Havertown, and Kurt W. Ledig,
Philadelphia, Pa., assignors to American Home
Products Corporation, New York, N.Y., a corporation of Delaware
No Drawing. Filed Aug. 29, 1966, Ser. No. 576,509
Int. Cl. C07c *119/00, 87/50, 49/28*
U.S. Cl. 260—518                      10 Claims This invention relates to new cyclopentanetrione derivatives and more particularly to various substituted 4-phenylimino-1,3-cyclopentanediones and their method of preparation.

The compounds deemed to involve patentable subject matter fall within the class of compounds illustrated by the formula:

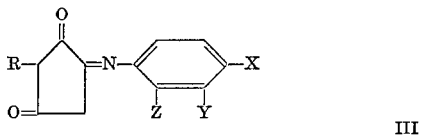

III wherein R is intended to represent a lower alkyl of 2 to 5 carbon atoms, a dialkylaminoalkyl, which may be represented by the radical

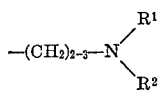

in which $R^1$ and $R^2$ are lower alkyls of 1 to 3 carbon atoms, phenyl(lower)alkyl, an aryl radical, preferably phenyl or substituted phenyl in which the substituents may be o, m, or p-lower alkyl, halo(lower)alkyl, lower alkoxy or halogen, preferably chlorine, while X stands for hydrogen, halogen or carboxy, Y represents hydrogen or hydroxy and Z represents hydrogen or carboxy.

The process of making compounds of Formula III may be concisely expressed by consideration of the following reaction scheme:

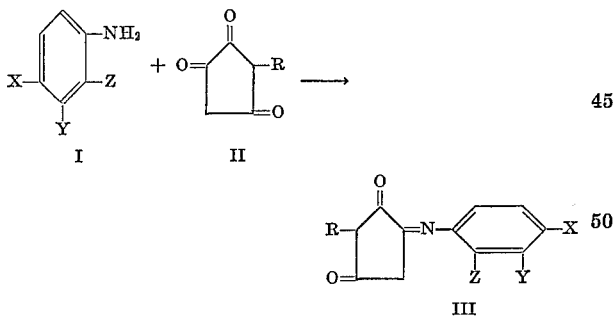

As will be noted from the above flow diagram, an aniline compound I is reacted with the appropriate 3-substituted-1,2,4-cyclopentanetrione II in an organic solvent medium in which the reactants will dissolve, for example, an alcoholic solvent such as ethyl alcohol. The reaction medium must be made acid which is effected by use of a strong acid, i.e., hydrochloric acid. The reaction mixture is refluxed for only a few minutes or merely warmed, and is then held at low temperatures until complete precipitation of the desired product is noted. The desired product III is then isolated in known manner and recrystallized from an alcoholic medium.

The starting cyclopentanetriones are prepared in known manner, involving the use of sodium methylate in a reaction comprising ethyl oxalate and a selected ketone which may be designated as $CH_3 \cdot CO \cdot CH_2$—R in which R represents the radicals indicated previously and the particular radical desired for the 3-position of the cyclopentanetrione. The reaction is carried out at temperatures ranging from refluxing conditions to —5° C., followed by hydrolysis with dilute mineral acid.

The compounds of the invention have been found pharmacologically active, a notable field of use being in their ability to control or moderate inflammatory disorders in the animal body. In addition, compounds of the invention have also shown significant antiviral activity and antiamebic activity as well as moderate antibacterial action against selected strains of such organisms as *Bacillus subtilis, Brucella bronchiseptica, Escherichia coli,* and *Salmonella paratyphi.* Thus, one area of use for the compounds is in experimental and comparative pharmacology. The compounds can be prepared in dosage forms in conventional and known manner, with or without carriers, extenders or excipients. Pharmacological activity will be noted when the compounds are administered in a daily dosage range, orally or parenterally, from about 5 mg. to 400 mg. per kilogram of body weight.

The following examples are given for the purpose of supplying a more exact and illustrative description of the process in preparing typical compounds of the invention.

EXAMPLE 1

2-ethyl-4-(o-carboxyphenylimino)-1,3-cyclopentanedione

A liter solution of crude 3-ethyl-1,2,4-cyclopentanetrione (10 g.) was refluxed with a solution of 20 g. of anthranilic acid in 100 ml. ethyl alcohol and 10 ml. of 10% hydrochloric acid for a few minutes, and then kept at 5° C. for two weeks. The resulting precipitate was filtered and recrystallized from ethanol, yielding 4.8 g. of the title compound, M.P. 221–223° C.

Found: C, 64.68; H, 4.96; N, 5.43%. $C_{14}N_{13}NO_4$ requires C, 64.86; H, 5.05; N, 5.40%.

EXAMPLE 2

2-ethyl-4-phenylimino-1,3-cyclopentanedione

A solution of 12.5 g. of 3-ethyl-1,2,4-cyclopentanetrione in 125 ml. of alcohol was treated with a solution of 10 ml. of aniline in 100 ml. of alcohol. The reaction mixture was cooled overnight and the resulting precipitate filtered to obtain 12.8 g. of the title compound, M.P. 167° C.

Found: C, 72.46; H, 5.88; N, 6.42%. $C_{13}H_{13}NO_2$ requires: C, 72.54; H, 6.09; N, 6.51%.

EXAMPLE 3

2-ethyl-4-(p-carboxy-m-hydroxyphenylimino)-1,3-cyclopentanedione

A mixture of 6.5 g. of 3-ethyl-1,2,4-cyclopentanetrione, 7.6 g. of 4-aminosalicylic acid in 200 ml. of ethanol was refluxed for 1 hour. The reaction mixture was kept in refrigerator (+5° C.) overnight and the resulting precipitate filtered. Recrystallization from dioxane-petroleum ether gave 9.6 g. of the title compound, M.P. 242° C.

Found: C, 60.91; H, 4.88; N, 4.85%. $C_{14}H_{13}NO_5$ requires: C, 61.09; H, 4.76; N, 5.09%.

EXAMPLE 4

2-propyl-4-(o-carboxyphenylimino)-1,3-cyclopentanedione

One liter of a solution containing 25 g. of crude 3-propyl-1,2,4-cyclopentanetrione was treated with a warm solution of 20 g. of anthranilic acid in 100 ml. of ethyl alcohol and 10 ml. of 10% hydrochloric acid and kept for 12 hours at 5° C. The resulting precipitate was filtered and recrystallized from ethanol, yielding 16.0 g. of the title compound, M.P. 219–221° C.

Found: C, 65.75; H, 5.17; N, 5.42%. $C_{15}H_{15}NO_4$ requires: C, 65.92; H, 5.53; N, 5.13%.

If one substitutes 3-(2-diethyl-aminoethyl)-1,2,4-cyclopentanetrione for the 3-propyl-1,2,4-cyclopentanetrione in the above example and carrying out a similar reaction, one will obtain 2-(2-diethylaminoethyl)-4-(o-carboxyphenylimino)-1,3-cyclopentanedione.

EXAMPLE 5

2-propyl-4-phenylimino-1,3-cyclopentanedione

An aqueous (1:1) alcoholic solution (350 ml.) containing 15 g. of 3-propyl-1,2,4-cyclopentanetrione was treated with 7 ml. of 10% hydrochloric acid and 35 ml. of aniline. The reaction mixture was kept in refrigerator overnight and the resulting precipitate filtered. Recrystallization from alcohol afforded 16.5 g. of the title compound, M.P. 150–151° C.

Found: C, 73.01; H, 6.51; N, 6.14%. $C_{14}H_{15}NO_2$ requires: C, 73.34; H, 6.59; N, 6.11%.

EXAMPLE 6

2-propyl-4-(p-chlorophenylimino)-1,3-cyclopentanedione

To an aqueous alcoholic solution (1:1, 100 ml.) containing 4 g. of 3-propyl-1,2,4-cyclopentanetrione was added 2 ml. of 10% hydrochloric acid and 10 g. of p-chloroaniline in 35 ml. of alcohol. The reaction mixture was kept in refrigerator (+5° C.) over two days and the resulting precipitate filtered to give 5 g. of the title compound, M.P. 174–176° C.

Found: C, 63.67; H, 5.34; Cl, 13.46; N, 5.28%. $C_{14}H_{14}ClNO_2$ requires: C, 63.76; H, 5.34; Cl, 13.44; N, 5.31%.

EXAMPLE 7

2-propyl-4-(p-carboxyphenylimino)-1,3-cyclopentanedione

To an aqueous alcoholic solution (1:1, 100 ml.) containing 4 g. of 3-propyl-1,2,4-cyclopentanetrione was added 2 ml. of 10% hydrochloric acid and 10 g. of a p-aminobenzoic acid. The reaction mixture was kept for 2 days at room temperature then for 7 days in refrigerator (+5° C.), and the resulting precipitate filtered. Recrystallization from ethanol yielded 2.9 g. of the title compound, M.P. 256–258° C.

Found: C, 65.63; H, 5:57; N, 5.01%. $C_{15}H_{15}NO_4$ requires: C, 65.92; H, 5.53; N, 5.13%.

EXAMPLE 8

2-isoamyl-4-phenylimino-1,3-cyclopentanedione

Aniline (20 ml.) was added to 200 ml. of a diluted alcoholic solution of crude 3-isoamyl-1,2,4-cyclopentanetrione. After adjusting the pH to 6 with 10% hydrochloric acid, the mixture was kept for 2 hrs. at room temperature. On standing at 5° overnight, the product crystallized promptly, which after recrystallization from ether melted at 148–149° C.

Found: C, 74.95; H, 7.58; N, 5.68%. $C_{16}H_{19}NO_2$ requires: C, 74.68; H, 7.44; N, 5.44%.

EXAMPLE 9

2-phenyl-4-(o-carboxyphenylimino)-1,3-cyclopentanedione

A suspension of 5.7 g. (30.0 mmoles) of 3-phenyl-1,2,4-cyclopentanetrione, 4.0 g. (30.0 mmoles) of anthranilic acid and 3.0 ml. of 10% hydrochloric acid in 50 ml. of alcohol (pH>1) was refluxed for a few minutes and cooled. The resulting precipitate was filtered and recrystallized from alcohol yielding 3.00 g. (30%) of the title compound, M.P. 242–244° C.

Found: C, 70.46; H, 4.41; N, 4.26%. $C_{18}H_{13}NO_4$ requires: C, 70.35; H, 4.26; N, 4.56%.

In similar manner, one may start with a substituted phenyl compound, for example, 3-p-methoxyphenyl-1,2,4-cyclopentanetrione and anthranilic acid to prepare, as in this case 2-(p-methoxyphenyl)-4-(o-carboxyphenylimino)-1,3-cyclopentanedione.

We claim:
1. A compound falling within the formula:

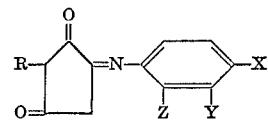

in which R represents a member selected from the group consisting of phenyl and a lower alkyl of 2 to 5 carbon atoms, X stands for a member of the group consisting of hydrogen, chlorine, and carboxy, Y stands for a member of the group consisting of hydrogen and hydroxy, while Z represents a member of the group consisting of hydrogen and carboxy.

2. As a compound of claim 1; 2-ethyl-4-(o-carboxyphenylimino)-1,3-cyclopentanedione.

3. As a compound of claim 1; 2-ethyl-4-phenylimino-1,3-cyclopentanedione.

4. As a compound of claim 1; 2-ethyl-4-(p-carboxy-m-hydroxyphenylimino)-1,3-cyclopentanedione.

5. As a compound of claim 1; 2-propyl-4-(o-carboxyphenylimino)-1,3-cyclopentanedione.

6. As a compound of claim 1; 2-propyl-4-phenylimino-1,3-cyclopentanedione.

7. As a compound of claim 1; 2-propyl-4-(p-chlorophenylimino)-1,3-cyclopentanedione.

8. As a compound of claim 1; 2-propyl-4-(p-carboxyphenylimino)-1,3-cyclopentanedione.

9. As a compound of claim 1; 2-isoamyl-4-phenylimino-1,3-cyclopentanedione.

10. As a compound of claim 1; 2-phenyl-4-(o-carboxyphenylimino)-1,3-cyclopentanedione.

References Cited

UNITED STATES PATENTS 3,278,599  10/1966  Wendt et al. _____ 260—566

LORRAINE A. WEINBERGER, Primary Examiner

L. A. THAXTON, Assistant Examiner

U.S. Cl. X.R.
260—519, 566, 999